I. E. BOWER.
Improvement in Hubs for Carriage Wheels.

No. 125,164.                                                  Patented April 2, 1872.

UNITED STATES PATENT OFFICE.

ISAAC E. BOWER, OF BAINBRIDGE, GEORGIA.

IMPROVEMENT IN HUBS FOR CARRIAGE-WHEELS.

Specification forming part of Letters Patent No. 125,164, dated April 2, 1872.

Specification describing a new and useful Improvement in Carriage-Wheels, invented by ISAAC E. BOWER, of Bainbridge, in the county of Decatur and State of Georgia.

The invention relates to that class of wheels which have the hub in two parts, so as to receive the spoke-holder between them. It consists in the improvement upon the spoke-holder, which is hereinafter fully described and pointed out in the claim.

Figure 1:
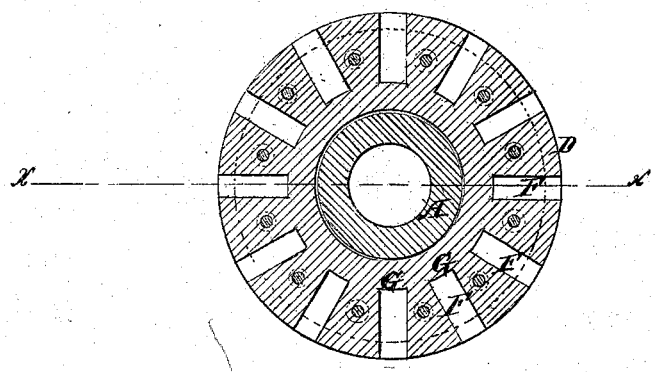
Figure 2:
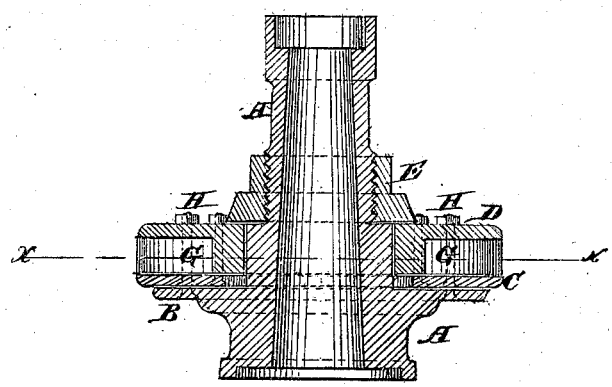

In the accompanying drawing, Figure 1 is a cross-section of the hub taken on the line $x\ x$ of Fig. 2. Fig. 2 is a longitudinal section of the hub taken on the line $y\ y$ of Fig. 1.

Similar letters of reference indicate corresponding parts.

A is the box and principal portion of the hub, which is bored out to receive the nut and axle and the nut and washer and axle, as is usual in pipe-boxes. B is a flange around the part A, against which the inner spoke-plate C bears. D is the main spoke-plate, which is bored, or an opening is made in it to allow it to slip on to the part A, as seen in Fig. 2, where it is securely held by the screw-nut E. The inner spoke-plate C is securely fastened to D by bolts, and confined between the two parts A and C, thereby forming mortises for the spokes of the recesses F in the plate C. G represents the bottom or base of the mortises, upon which the ends of the spokes rest. The inner plate C rests against the flange B, through which flange the fastening-bolts H pass, as seen in Fig. 2. The nut E is of sufficient size to cover the opening in D and lap out on to it so as to hold it firmly to the main body A of the hub.

Having thus described my invention, I claim as new and desire to secure by Letters Patent—

The combination, with a two-part hub, A B E, of a two-part spoke-holder, C D F, having the annular bottom G, as described, to take the pressure of the spokes, and thereby relieve the hub from wear.

ISAAC E. BOWER.

Witnesses:
   JNO. T. WIMBERLY,
   CHARLES G. CAMPBELL.